United States Patent
Rao et al.

(10) Patent No.: US 9,606,935 B2
(45) Date of Patent: Mar. 28, 2017

(54) METHOD AND APPARATUS FOR PREVENTING NON-TEMPORAL ENTRIES FROM POLLUTING SMALL STRUCTURES USING A TRANSIENT BUFFER

(71) Applicant: Intel Corporation, Santa Clara, CA (US)

(72) Inventors: Ravishankar Rao, Redwood City, CA (US); Nishit Shah, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/182,618

(22) Filed: Feb. 18, 2014

(65) Prior Publication Data

US 2014/0317351 A1    Oct. 23, 2014

Related U.S. Application Data

(60) Provisional application No. 61/793,042, filed on Mar. 15, 2013.

(51) Int. Cl.
| | |
|---|---|
| *G06F 3/00* | (2006.01) |
| *G06F 12/0897* | (2016.01) |
| *G06F 12/122* | (2016.01) |
| *G06F 12/128* | (2016.01) |
| G06F 12/0811 | (2016.01) |
| G06F 12/1027 | (2016.01) |

(52) U.S. Cl.
CPC ........ *G06F 12/0897* (2013.01); *G06F 12/122* (2013.01); *G06F 12/128* (2013.01); *G06F 12/0811* (2013.01); *G06F 12/1027* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 5,651,124 A | | 7/1997 | Shen et al. |
| 6,584,529 B1 * | | 6/2003 | Thomas ................. G06F 13/16 370/429 |
| 7,734,895 B1 | | 6/2010 | Agarwal et al. |
| 8,438,334 B2 * | | 5/2013 | Bell et al. ..................... 711/117 |
| 8,769,241 B2 * | | 7/2014 | Chiang et al. ............... 711/203 |
| 8,832,354 B2 * | | 9/2014 | Sokolov et al. ............. 711/103 |

(Continued)

FOREIGN PATENT DOCUMENTS

TW    201250583    12/2012

*Primary Examiner* — Elias Mamo
(74) *Attorney, Agent, or Firm* — Nicholson, De Vos, Webster & Elliot, LLP

(57) ABSTRACT

A method for preventing non-temporal entries from entering small critical structures is disclosed. The method comprises transferring a first entry from a higher level memory structure to an intermediate buffer. It further comprises determining a second entry to be evicted from the intermediate buffer and a corresponding value associated with the second entry. Subsequently, responsive to a determination that the second entry is frequently accessed, the method comprises installing the second entry into a lower level memory structure. Finally, the method comprises installing the first entry into a slot previously occupied by the second entry in the intermediate buffer.

17 Claims, 7 Drawing Sheets

(56) References Cited

U.S. PATENT DOCUMENTS

| | | | |
|---|---|---|---|
| 2002/0042863 A1* | 4/2002 | Jeddeloh | G06F 12/084 711/143 |
| 2009/0049234 A1* | 2/2009 | Oh et al. | 711/103 |
| 2010/0153690 A1 | 6/2010 | Vick et al. | |
| 2010/0274973 A1* | 10/2010 | Balakrishnan | G06F 12/0846 711/130 |
| 2011/0153307 A1 | 6/2011 | Winkel et al. | |
| 2011/0231593 A1* | 9/2011 | Yasufuku | G06F 12/1027 711/3 |

* cited by examiner

METHOD AND APPARATUS FOR PREVENTING NON-TEMPORAL ENTRIES FROM POLLUTING SMALL STRUCTURES USING A TRANSIENT BUFFER

CROSS REFERENCE TO RELATED APPLICATIONS

This application is a conversion of and claims priority to and the benefit of Provisional Patent Application No. 61/793,042, entitled "Method and Apparatus for Preventing Non-Temporal Entries from Polluting Small Structures Using a Transient Buffer," having a filing Date of Mar. 15, 2013, which is herein incorporated by reference in its entirety.

FIELD OF THE INVENTION

Embodiments according to the present invention generally relate to microprocessor architecture and more particularly to the architecture of critical structures for microprocessors.

BACKGROUND OF THE INVENTION

Microprocessors typically have several small critical structures. The critical structures can, for example, include instruction caches, data caches, and translation look-aside buffers (TLB). Typically, these structures are organized as set-associative structures with several levels of hierarchy for each structure.

The miss of an entry from a structure that is lower in the hierarchy, e.g., a Level 1 ("L1") cache causes the entry to then be accessed from a higher level structure, e.g., a Level 2 ("L2") cache and installed into the lower level. This installation into the lower level structure is required because typically such entries will be accessed repeatedly and the access times from lower level structures is much faster than from the higher level structures. Stated differently, there is a significantly higher penalty to access larger structures, e.g., a L2 cache over small structures, e.g., a L1 cache. Certain accesses, however, do not have much temporal locality. An instruction on a mispredicted path of a branch is a good example. An instruction on a mispredicted path may be accessed only a few times, but is unlikely to be subsequently accessed.

Installing entries from a mispredicted path into a lower level structure, e.g., L1 cache, is problematic because the lower level structures are typically very small due to area constraints and installation of entries from a mispredicted path and aggressive prefetching techniques may cause useful entries to be evicted from the lower level arrays in favor of less useful entries. Further, if a latency of accessing the next-level structure, e.g., an L2 cache is relatively high, evicting useful entries can have a significant penalty.

Conventional processors have dealt with the problem of minimizing the penalty of accessing higher level structures in various ways. Victim caches are one example of how conventional processors have tried to reduce the penalty of accessing higher level structures. FIG. 1 illustrates a victim cache scheme implemented by a conventional processor. In the victim cache scheme, incoming blocks from memory 158 (or L2 cache 156 if present) are always loaded into the L1 cache 102 with one of the cache blocks in L1 102 being replaced and moved to the victim cache 104. The victim cache 104 in turn discards one of its blocks and moves it back to memory 158 (or L2 cache 156 if present). The net effect is that when a new block is brought into the L1 cache 102, it is a victim cache block that is replaced with the discarded block being returned to main memory 158 (or the L2 cache 156).

As is well known, the L1 cache 102, often called the primary cache, is a static memory integrated with processor core 120 that is used to store information recently accessed by the processor 120. The purpose of the L1 cache 102 is to improve data access speed in cases where the CPU accesses the same data multiple times. The access time of the L1 cache 120 is always faster than the access time of system memory 158 or L2 cache 156. For this reason, it is important to make that critical data is present in L1 cache most of the time.

Conventional schemes such as implementing a victim cache, however, do not address the problem of temporal locality. In other words, conventional processors do not address the problem of prioritizing more frequently accessed entries over less frequently accessed or unnecessary entries. For example, in FIG. 1, the victim cache scheme illustrated does not have any circuitry or logic configured to filter out the less useful or less frequently accessed entries such that only the entries with the highest temporal locality are retained within the L1 cache 102 and victim cache 104.

BRIEF SUMMARY OF THE INVENTION

Accordingly, a need exists for a method and apparatus for a more efficient and flexible processor architecture that reduces the penalty of accessing higher level structures and increases temporal locality within the lower level structures. In one embodiment, the present invention reduces the penalty of accessing higher level structures by implementing a transient buffer between a higher level structure, e.g., a L2 cache, and a lower level structure, e.g., a L1 cache to store entries that are incoming from the higher level structure. Further, to increase the temporal locality within lower level structures, the transient buffer can be configured with circuitry to filter out less frequently used and unnecessary entries and install only more frequently used and necessary entries into the lower level structure, e.g., a L1 cache.

The transient buffer of the present invention is advantageous because it allows the lower level structures, e.g., a L1 cache to be populated with only the most useful and frequently access entries. In addition, the transient buffer of the present invention reduces the penalty of accessing higher level structures by providing an additional small structure such as the transient buffer of the present invention to store incoming entries from a higher level structure. Further, the confidence logic circuitry implemented within the transient buffer in an embodiment of the present invention is advantageous because it selectively determines the entries to be transferred over to other lower level structures, e.g., the L1 cache, thereby, improving temporal locality. The less frequently accessed or unnecessary entries are selectively discarded by the transient buffer and are not transferred over to the lower level structures.

In one embodiment, a method for preventing non-temporal entries from entering small critical structures is disclosed. The method comprises transferring a first entry from a higher level memory structure to an intermediate buffer. It further comprises determining a second entry to be evicted from the intermediate buffer and a corresponding value associated with the second entry. Subsequently, responsive to a determination that the second entry is frequently accessed, the method comprises installing the second entry into a lower level memory structure. Finally, the method comprises installing the first entry into a slot previously occupied by the second entry in the intermediate buffer.

In another embodiment, a processor unit configured to perform a method for preventing non-temporal entries from entering small critical structures is presented. The method comprises transferring a first entry from a higher level memory structure to an intermediate buffer. It further comprises determining a second entry to be evicted from the intermediate buffer and a corresponding value associated with the second entry. Subsequently, responsive to a determination that the second entry is frequently accessed, the method comprises installing the second entry into a lower level memory structure. Finally, the method comprises installing the first entry into a slot previously occupied by the second entry in the intermediate buffer.

Finally, in a different embodiment, an apparatus for preventing non-temporal entries from entering small critical structures is disclosed. The apparatus comprises a memory and a processor communicatively coupled to the memory. The processor is configured to: (a) transfer a first entry from a higher level memory structure to an intermediate buffer; (b) determine a second entry to be evicted from the intermediate buffer and a corresponding value associated with the second entry; (c) responsive to a determination that the second entry is frequently accessed, install the second entry into a lower level memory structure; and (d) install the first entry into a slot previously occupied by the second entry in the intermediate buffer.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
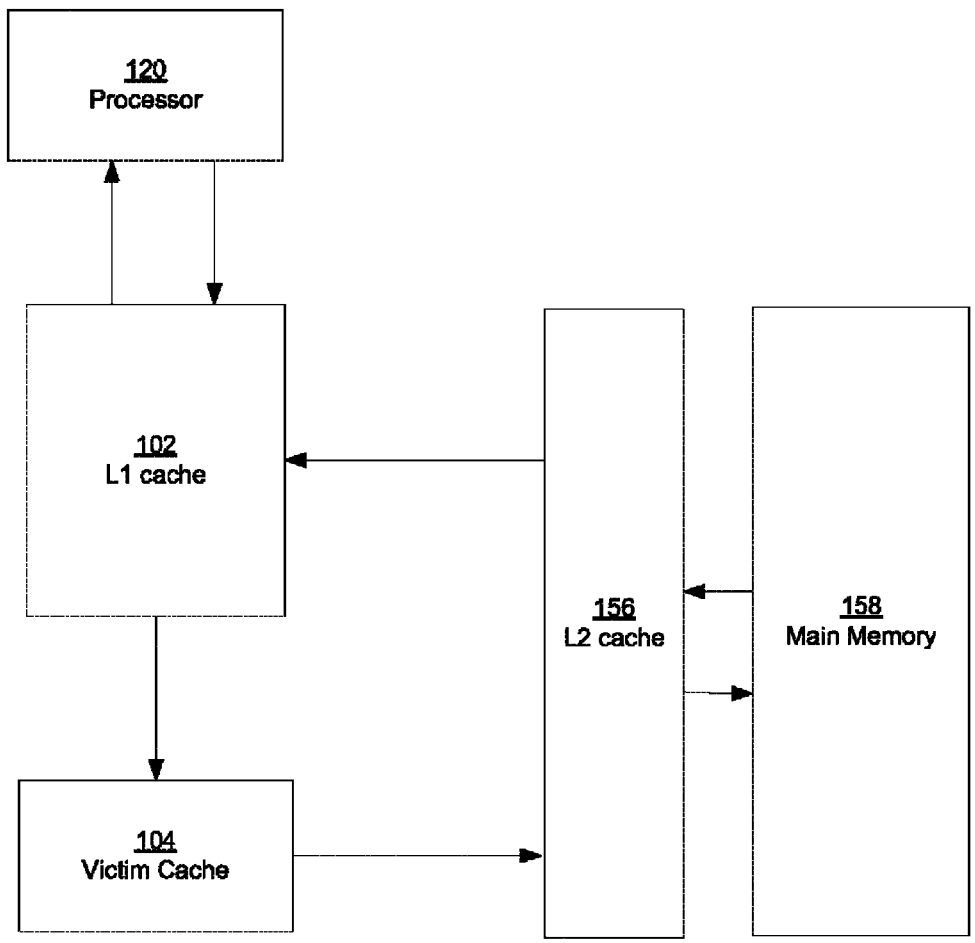
FIG. 1 illustrates a victim cache scheme implemented by a conventional processor.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "transferring," "installing," "receiving," "determining," "evicting" or the like, refer to actions and processes (e.g., flowchart 700 of FIG. 7) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 2:
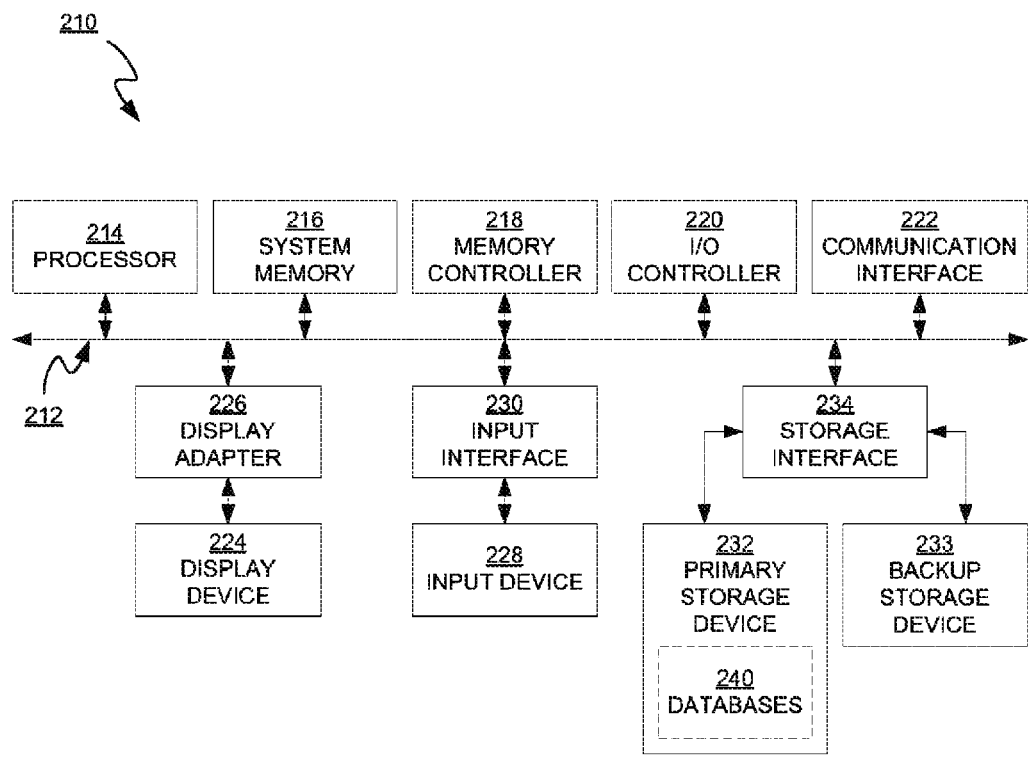
FIG. 2 is an exemplary computer system in accordance with embodiments of the present invention.

FIG. 2 is a block diagram of an example of a computing system 210 capable of being integrated with a processor 214 of an embodiment of the present disclosure. Computing system 210 broadly represents any single or multi-processor computing device or system capable of executing computer-readable instructions. Examples of computing system 210 include, without limitation, workstations, laptops, client-side terminals, servers, distributed computing systems, handheld devices, or any other computing system or device. In its most basic configuration, computing system 210 may include at least one processor 214 of an embodiment of the present invention and a system memory 216.

Processor 214 incorporates embodiments of the present invention and generally represents any type or form of processing unit capable of processing data or interpreting and executing instructions. In certain embodiments, processor 214 may receive instructions from a software application or module. These instructions may cause processor 214 to perform the functions of one or more of the example embodiments described and/or illustrated herein. In one embodiment, processor 214 may be an out of order microprocessor. In a different embodiment, processor 214 may be a superscalar processor. In yet another embodiment, processor 214 may comprise multiple processors operating in parallel.

System memory 216 generally represents any type or form of volatile or non-volatile storage device or medium capable of storing data and/or other computer-readable instructions. Examples of system memory 216 include, without limitation, RAM, ROM, flash memory, or any other suitable memory device. Although not required, in certain embodiments computing system 210 may include both a volatile memory unit (such as, for example, system memory 216) and a non-volatile storage device (such as, for example, primary storage device 232).

Computing system 210 may also include one or more components or elements in addition to processor 214 and system memory 216. For example, in the embodiment of FIG. 2, computing system 210 includes a memory controller 218, an input/output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an Industry Standard Architecture (ISA), Peripheral Component Interconnect (PCI), PCI Express (PCIe), or similar bus) and a network.

Memory controller 218 generally represents any type or form of device capable of handling memory or data or controlling communication between one or more components of computing system 210. For example, memory controller 218 may control communication between processor 214, system memory 216, and I/O controller 220 via communication infrastructure 212.

I/O controller 220 generally represents any type or form of module capable of coordinating and/or controlling the input and output functions of a computing device. For example, I/O controller 220 may control or facilitate transfer of data between one or more elements of computing system 210, such as processor 214, system memory 216, communication interface 222, display adapter 226, input interface 230, and storage interface 234.

Communication interface 222 broadly represents any type or form of communication device or adapter capable of facilitating communication between example computing system 210 and one or more additional devices. For example, communication interface 222 may facilitate communication between computing system 210 and a private or public network including additional computing systems. Examples of communication interface 222 include, without limitation, a wired network interface (such as a network interface card), a wireless network interface (such as a wireless network interface card), a modem, and any other suitable interface. In one embodiment, communication interface 222 provides a direct connection to a remote server via a direct link to a network, such as the Internet. Communication interface 222 may also indirectly provide such a connection through any other suitable connection.

Communication interface 222 may also represent a host adapter configured to facilitate communication between computing system 210 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 222 may also allow computing system 210 to engage in distributed or remote computing. For example, communication interface 222 may receive instructions from a remote device or send instructions to a remote device for execution.

As illustrated in FIG. 2, computing system 210 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data for display on display device 224.

As illustrated in FIG. 2, computing system 210 may also include at least one input device 228 coupled to communication infrastructure 212 via an input interface 230. Input device 228 generally represents any type or form of input device capable of providing input, either computer- or human-generated, to computing system 210. Examples of input device 228 include, without limitation, a keyboard, a pointing device, a speech recognition device, or any other input device.

As illustrated in FIG. 2, computing system 210 may also include a primary storage device 232 and a backup storage device 233 coupled to communication infrastructure 212 via a storage interface 234. Storage devices 232 and 233 generally represent any type or form of storage device or medium capable of storing data and/or other computer-readable instructions. For example, storage devices 232 and 233 may be a magnetic disk drive (e.g., a so-called hard drive), a floppy disk drive, a magnetic tape drive, an optical disk drive, a flash drive, or the like. Storage interface 234 generally represents any type or form of interface or device for transferring data between storage devices 232 and 233 and other components of computing system 210.

In one example, databases 240 may be stored in primary storage device 232. Databases 240 may represent portions of a single database or computing device or it may represent multiple databases or computing devices. For example, databases 240 may represent (be stored on) a portion of computing system 210. Alternatively, databases 240 may represent (be stored on) one or more physically separate devices capable of being accessed by a computing device, such as computing system 210.

Continuing with reference to FIG. 2, storage devices 232 and 233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 232 and 233 may also include other similar structures or devices for allowing computer software, data, or other computer-readable instructions to be loaded into computing system 210. For example, storage devices 232 and 233 may be configured to read and write software, data, or other computer-readable information. Storage devices 232 and 233 may also be a part of computing system 210 or may be separate devices accessed through other interface systems.

Many other devices or subsystems may be connected to computing system 210. Conversely, all of the components and devices illustrated in FIG. 2 need not be present to practice the embodiments described herein. The devices and subsystems referenced above may also be interconnected in different ways from that shown in FIG. 2. Computing system 210 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 210. All or a portion of the computer program stored on the computer-readable medium may then be stored in system memory 216 and/or various portions of storage devices 232 and 233. When executed by processor 214, a computer program loaded into computing system 210 may cause processor 214 to perform and/or be a means for performing the functions of the example embodiments described and/or illustrated herein. Additionally or alternatively, the example embodiments described and/or illustrated herein may be implemented in firmware and/or hardware.

Method and Apparatus for Preventing Non-Temporal Entries from Polluting Small Structures Using a Transient Buffer Embodiments of the present invention provide a method and apparatus for a more efficient and flexible processor architecture that reduces the penalty of accessing higher level structures and increases the temporal locality within the lower level structures. In one embodiment, the present invention, reduces the penalty of accessing higher level structures by implementing a transient buffer between a higher level structure, e.g., a L2 cache, and a lower level structure, e.g., a L1 cache to store entries that are incoming from the higher level structure. Further, to increase the temporal locality within lower level structures, the transient buffer can be configured with circuitry to filter out less frequently used and unnecessary entries and install only more frequently used and necessary entries into the lower level structure, e.g., a L1 cache.

It is not always useful to install all non-temporal entries into lower level critical structures, e.g., an L1 cache especially when they are really small because when a new entry gets installed an existing entry is evicted. The transient buffer of the present invention is advantageous because it allows the lower level structures, e.g., a L1 cache to be populated with only the most useful and frequently access entries. In addition, the transient buffer of the present invention reduces the penalty of accessing higher level structures by providing an additional small structure to store incoming entries from a higher level structure. Further, the confidence logic circuitry implemented within the transient buffer in an embodiment of the present invention is advantageous because it selectively determines the entries to be transferred over to other lower level structures, e.g., the L1 cache, thereby, improving temporal locality. The less frequently accessed or unnecessary entries are selectively discarded by the transient buffer and are not transferred over to the lower level structures.

Figure 3:
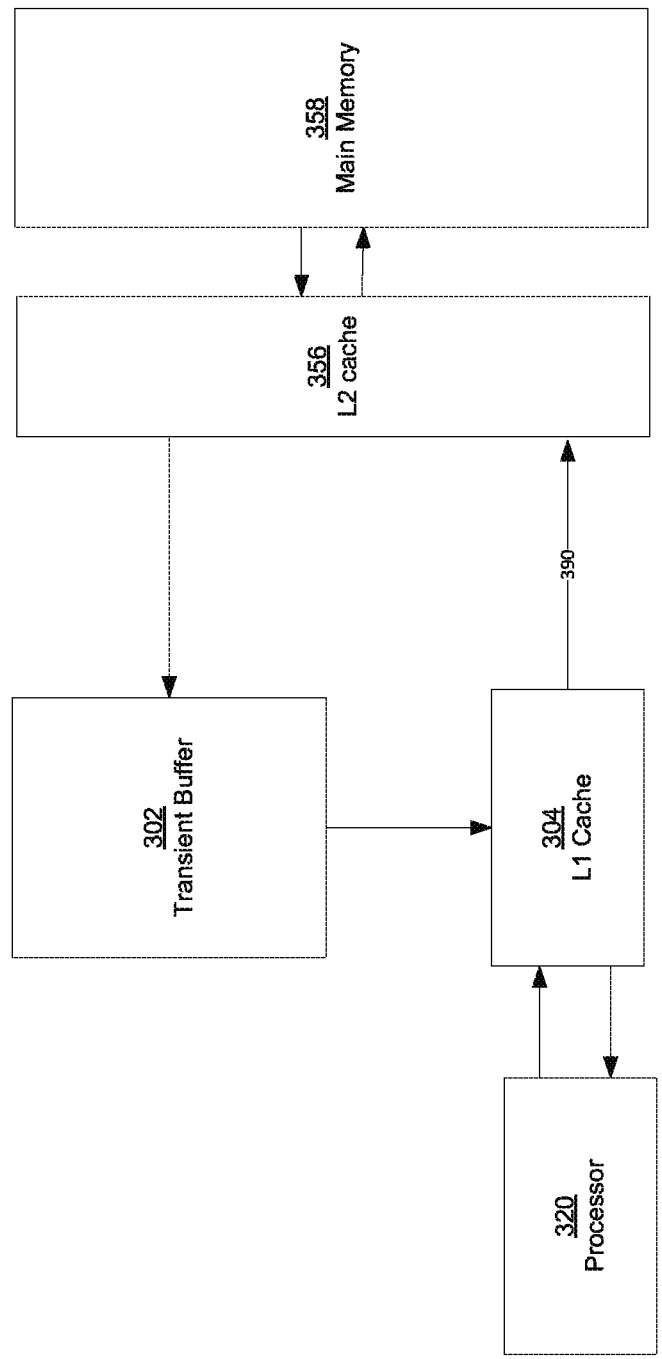
FIG. 3 is an exemplary block diagram illustrating the transient buffer scheme in accordance with embodiments of the present invention.

FIG. 3 is an exemplary block diagram illustrating the transient buffer scheme in accordance with embodiments of the present invention. Incoming blocks from memory 358 or the L2 cache 356, if present, are loaded into transient buffer 302. As will be described in detail in connection with FIG. 5, the transient buffer 302 comprises replacement logic circuitry to determine which of its entries can be evicted from the transient buffer. Further, it comprises confidence circuitry to determine if the evicted entry is critical enough to be installed into the critical structure, e.g., L1 cache 304. The L1 cache 304, as indicated above, is a static memory integrated with processor core 320 that is used to store information recently accessed by the processor 320.

In contrast to the victim cache scheme of FIG. 1, the entries from the L2 cache 356 or main memory 358 get installed directly into the transient buffer 302 instead of the L1 cache 304. Further, unlike the victim cache, the transient buffer 302 can, in one embodiment, filter out less frequently used and unnecessary entries and install only more frequently used or necessary entries into the L1 cache 304. Accordingly, unlike the victim cache, an incoming entry from L2 cache 358 or main memory 358 may not result in a block being transferred to the L1 cache 304. In some cases, a less frequently accessed or unnecessary block may simply be discarded in order to make room for the incoming block. By comparison, any incoming block from the L1 cache 102 results in the victim cache 104 evicting and transferring a block down to the L2 cache 156 or main memory 158. Unlike the transient buffer of the present invention, victim cache 102 does not have circuitry to determine the importance of an entry and, therefore, treats all entries the same.

The transient buffer 302 does not preclude using the victim cache scheme in addition to the transient buffer scheme of the present invention. In one embodiment, a victim cache can also be employed on path 390 between the L1 cache 304 and L2 cache 356 to store incoming blocks evicted from the L1 cache 304. The victim cache would therefore serve to reduce the penalty of accessing the L2 cache 356 when certain blocks that were evicted from the L1 cache 304 due to lack of storage space are needed.

Further, it is to be noted that while the embodiment discussed herein refer to L1 and L2 caching structures, the present invention can be applied equally to treatment of non-temporal entries with respect to other types of critical structures.

Figure 4:
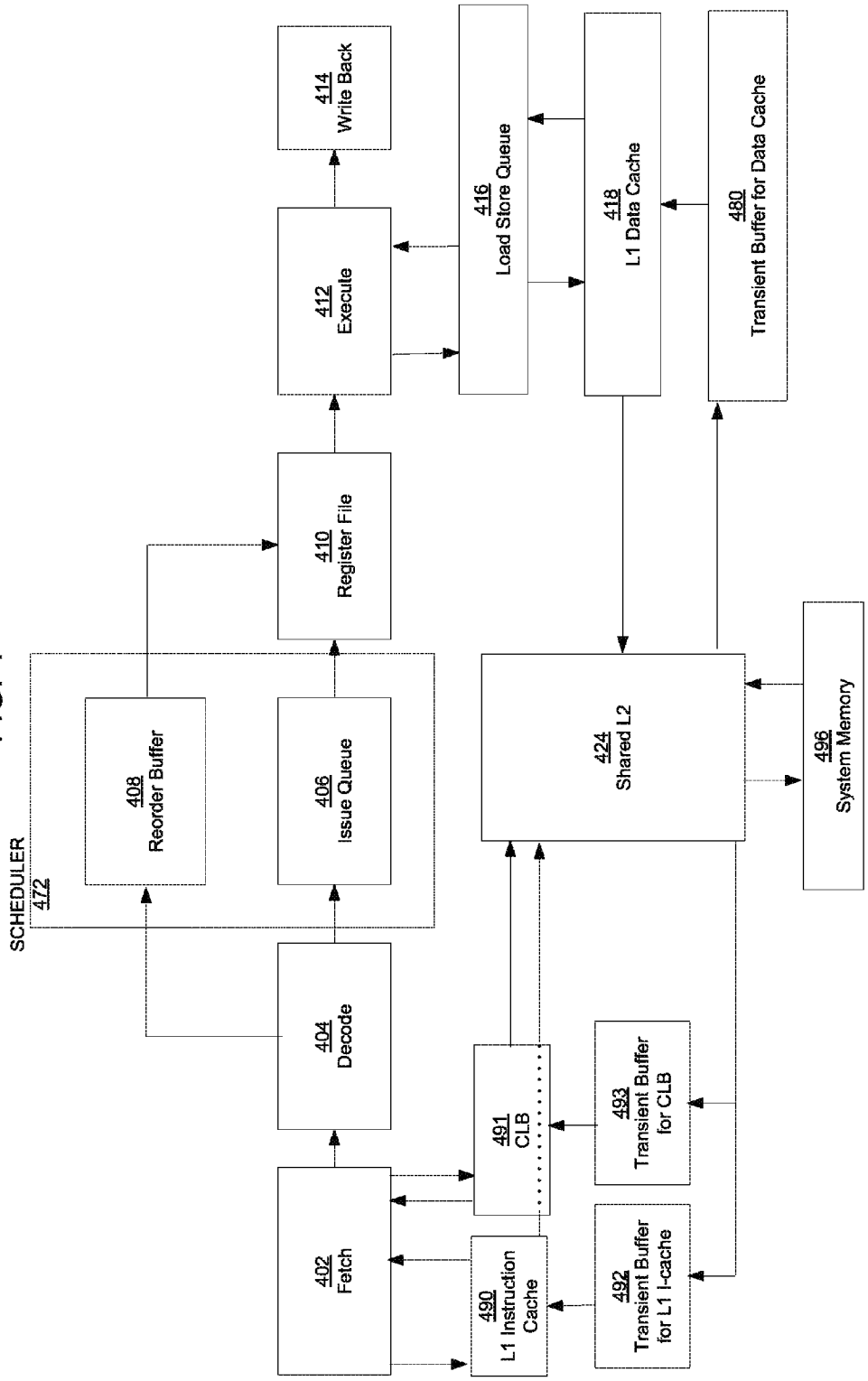
FIG. 4 is a more detailed block diagram illustrating an exemplary deployment of the transient buffer in a microprocessor pipeline in accordance with embodiments of the present invention.

FIG. 4 is a more detailed block diagram illustrating an exemplary deployment of the transient buffer in an out-of-order ("OOO") microprocessor pipeline in accordance with embodiments of the present invention. It is to be noted, that while the transient buffer is illustrated in FIG. 4 in the context of an OOO microprocessor, embodiments of the present invention can be used in other kinds of processors as well.

Instructions are fetched at the fetch stage 402 and placed in the instruction fetch queue (IFQ) (not shown) within fetch stage 402. The instructions are generally the original assembly instructions found in the executable program.

Instructions are accessed, in one embodiment, by fetch stage 402 from an L1 instruction cache 490 ("L1 I-cache"), which is the primary structure. In one embodiment, the transient buffer 492 may be used before a L1 I-cache. The instructions are conveyed to the L1 I-cache from the Shared L2 cache 424. Shared L2 cache 424 is a shared instruction and data cache in the embodiment illustrated in FIG. 4. The transient buffer for L1 I-Cache stores all the entries brought in from Shared L2 424. These entries are not directly installed into L1 I-cache 490. As discussed above, the transient buffer 492 is operable to filter out less frequently used and unnecessary entries from L1 I-cache 490 and install only more frequently or necessary entries into the L1 I-cache.

In one embodiment, the transient buffer of the present invention can be used in an emulated architecture. In one embodiment of an emulated architecture, code is executed in sequence of instructions called traces. In such embodiments, a CLB 491 is needed in addition to the L1 I-cache. Similar to the transient buffer 492 for the L1 I-cache, a transient buffer 493 is maintained for the CLB as well. The traces may be formed on a demand basis and may not have the locality of the guest code being emulated. The CLB 491 maintains a mapping between a guest address and the corresponding native address. The CLB structure is a very critical resource in the machine. Program flow may cause the entries to be brought into the CLB 491 for short execution durations. There may potentially be no temporal locality to these entries. In such cases, the transient buffer can protect critical structures like CLB from evicting other entries that might have a more long term requirement than the entries with little or no temporal locality.

The instructions brought into Fetch stage 402 reference the architectural registers, which are stored in register file 410. If the first fetched instruction was to be interrupted or raise an exception, the architectural register file 410 stores the results of all instructions until that point. Stated differently, the architectural register file stores the state that needs to be saved and restored in order to return back to the program during debugging or otherwise.

In an OOO microprocessor, the instructions execute out of order while still preserving data dependence constraints. Because instructions may finish in an arbitrary order, the architectural register file 410 cannot be modified by the instructions as they finish because it would make it difficult to restore their values accurately in the event of an exception or an interrupt. Hence, every instruction that enters the pipeline is provided a temporary register where it can save its result. The temporary registers are eventually written into the architectural register file in program order. Thus, even though instructions are being executed out of order, the contents of the architectural register files change as though they were being executed in program order.

The ROB 408 can facilitate this process. After the instructions are dispatched from the fetch unit 402, they are decoded by decode module 404 and are placed in the ROB 408 and issue queue 406 (IQ). The ROB 408 and IQ 406 may be part of a scheduler module 472. As scheduler module 472 issues or dispatches instructions out of IQ 406 out of order, they are executed by execute module 412.

In one embodiment, the write back module 414 will write the resulting values from those instructions back to the temporary registers in ROB 408 and rely on the ROB 408 to facilitate committing the instructions in order. However, in a different embodiment, write back module 414 writes the values resulting from instruction execution directly into register file 410 without sorting them. The unordered elements are added in physical memory to the register file 410 in an unordered fashion and are then retired to the architectural files in order at the retirement stage using a ROB initiated protocol.

The instructions issued out of order from the IQ 306 may also comprise loads and stores. As explained above, when loads and stores are issued out of order from the IQ 406, there are memory dependencies between them that need to be resolved before those instructions can be committed. Accordingly, the load and stores instructions are stored in a Load Store Queue (LSQ) 416 while the dependencies between them are resolved with the help of ROB 408.

The memory stage in the embodiment shown in FIG. 4 comprises L1 data cache ("L1 D-cache") 418, transient buffer for data cache 480, shared L2 cache 424 and system memory 496. Transient buffer for data cache 480 operates similarly to transient buffer 492. It should be noted that in one embodiment, the pipeline may either have a transient buffer for the I-cache 490 or the D-cache 418 but not both. The transient buffer 480 is operable to filter out less frequently used and unnecessary entries from L2-cache 424 and install only more frequently used or necessary entries into L1-D-cache 418.

Figure 5:
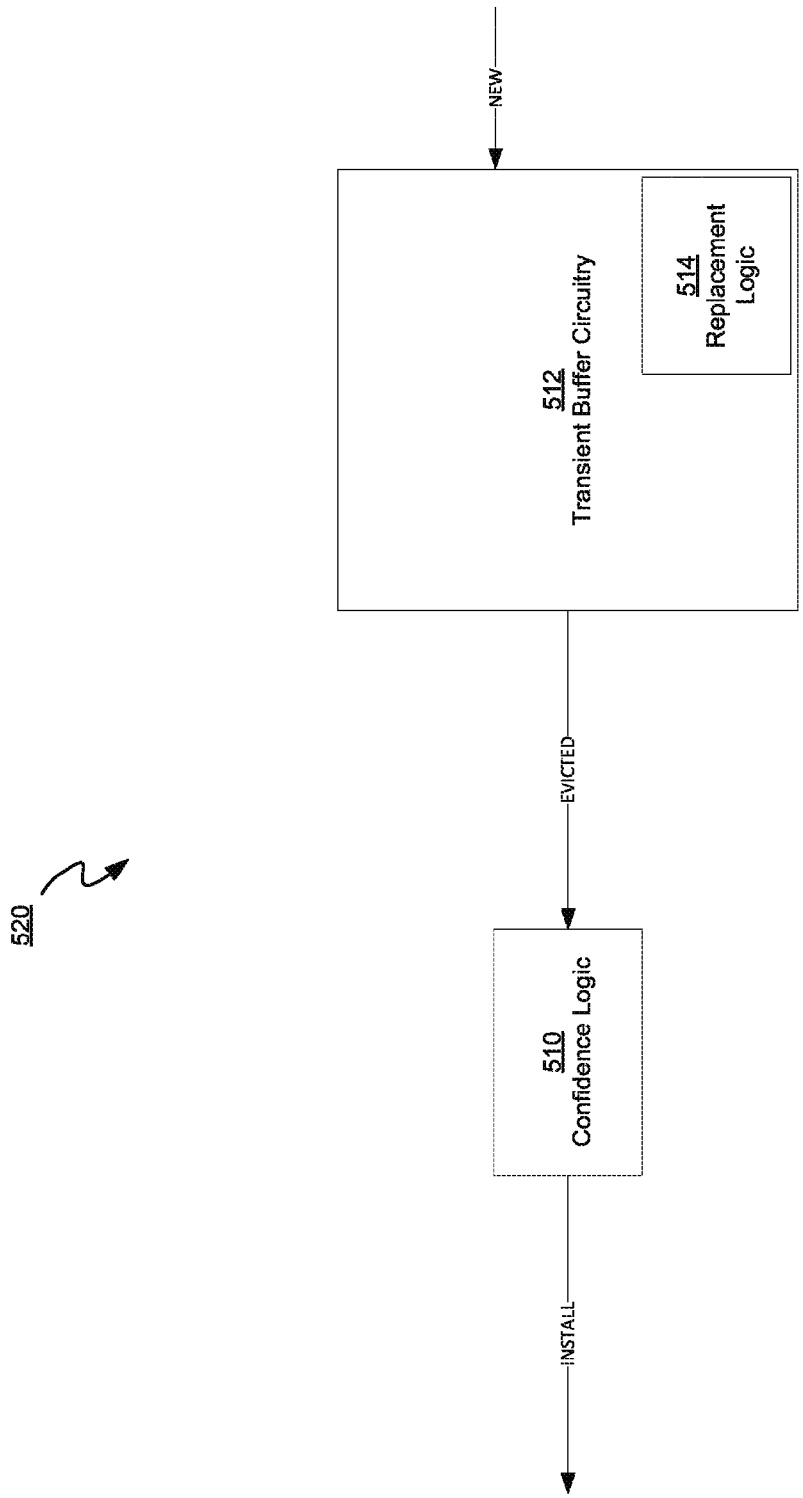
FIG. 5 is an exemplary block diagram illustrating the components comprising the transient buffer in accordance with embodiments of the present invention.

FIG. 5 is an exemplary block diagram illustrating the components comprising the transient buffer in accordance with embodiments of the present invention. The transient buffer 520 comprises transient buffer circuitry 512, replacement logic block 514 and confidence logic block 510.

As stated above, the purpose of the transient buffer 520 is to store all entries brought in from a higher level structure, e.g., L2-cache 424 before select entries are evicted out to the L1-cache, e.g., D-cache 418. When a new entry is brought in, it is placed in the transient buffer 520. Replacement logic module 514 determines the entry to be evicted from the transient buffer. Several implementations of replacement logic are possible. Some examples of replacement policies are an access counter based replacement policy, a least-recently used replacement policy or a random replacement policy. However, in other embodiments, other types of policies can be used as well and the invention is not limited to any one type of replacement policy.

Once the entry to be evicted from transient buffer circuitry module 512 is determined, confidence logic block 510 is used to determine if the evicted entry is critical enough to be installed into the critical structure, e.g., L1 D-cache 418. If the confidence logic circuitry 510 determines that the entry being evicted is critical, then it is installed into the critical structure. Otherwise, the entry is discarded.

Figure 6:
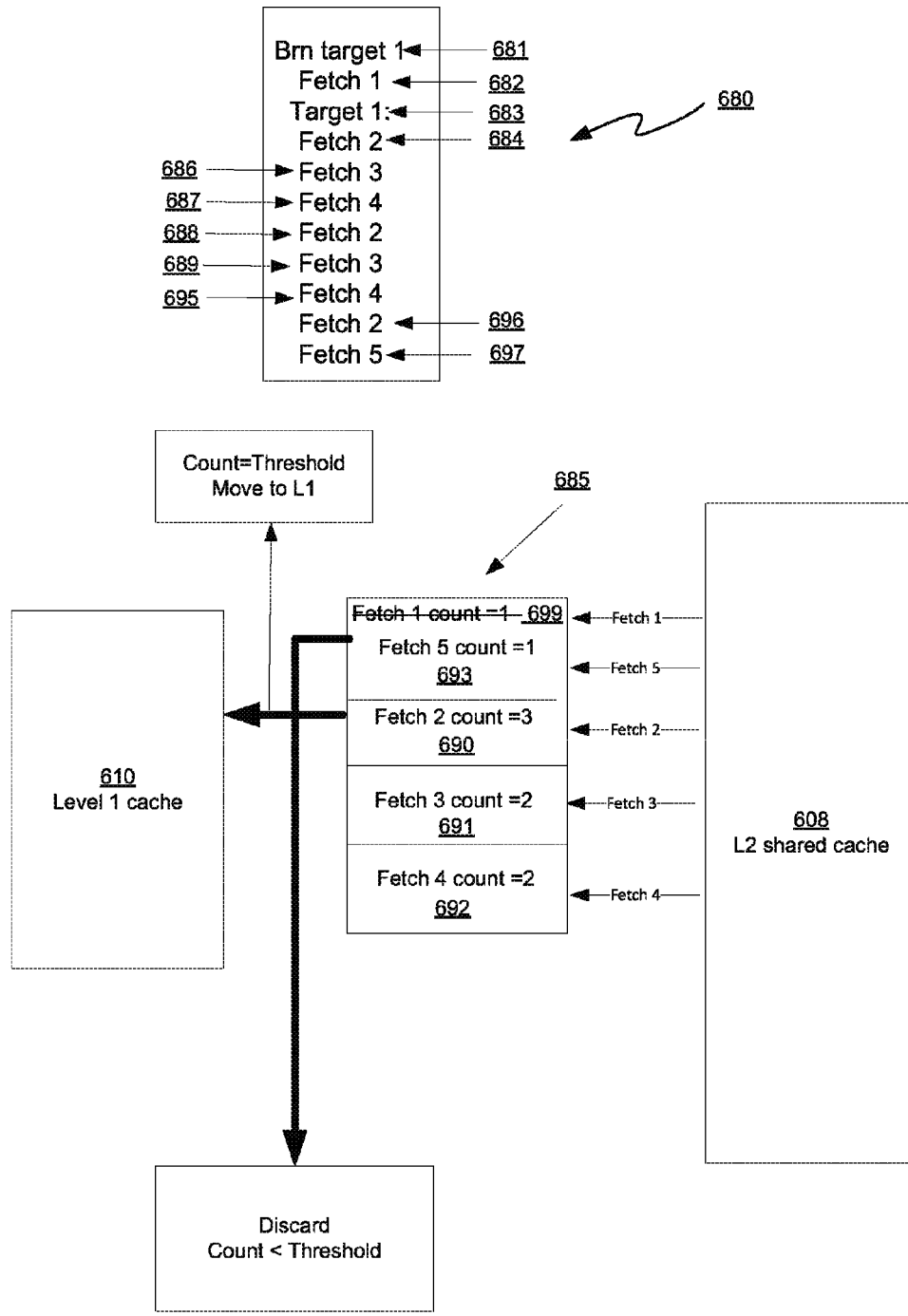
FIG. 6 is an exemplary block diagram illustrating the behavior of the confidence logic circuitry of the transient buffer in accordance with embodiments of the present invention.

FIG. 6 is an exemplary block diagram illustrating the behavior of the confidence logic circuitry of the transient buffer in accordance with embodiments of the present invention.

Several approaches can be used to implement the confidence logic. In one embodiment, a counter based approach is employed. Consider the transient buffer 685 illustrated in FIG. 6. Transient buffer 685 receives entries from L2 shared cache 608 and stores and filters them before installing any entries into the L1 cache 610. In the example shown in FIG. 4, the transient buffer 685 is illustrated as comprising only 4 entries for the sake of simplicity. However, in other embodiments, the transient buffer can be scaled to have as many entries as required by the architecture. Each of the entries, 693, 690, 691 and 692 has a counter associated with it. When an entry is installed into a slot of the buffer of the present invention, this counter is initialized to a predefined value. When a particular entry is missing from a lower level structure, e.g., a L1 cache 610, the buffer 685 is accessed. In one embodiment, both the lower level structure and the buffer 685 are accessed at the same time, so the chances of finding a hit are increased. If the entry is found in buffer 685, then access latency to the entry is significantly less than if L2 cache 608 had to be accessed for the entry. Accordingly, buffer 685 helps to reduce latency and get results faster.

Each time a particular entry is accessed in the buffer, the count for that entry is increased. The count that is maintained for each entry is used by confidence logic circuitry 510 to filter out less frequently used entries from more frequently used entries. A predefined threshold value is used to determine if the entry is to be installed in the lower level structure, e.g., L1 cache 610. In one embodiment of the present invention, when the threshold value is reached by an entry, it is not immediately installed in the L1-cache 610. Instead, it is installed when replacement logic module 514 chooses that entry to be evicted from transient buffer 685. This allows the entries in the L1-cache to be kept intact as long as possible. In other embodiments, however, the entries can be installed from buffer 685 to the L1 cache 610 immediately after reaching their threshold value.

The example of FIG. 6, as will be discussed below, demonstrates how the transient buffer 685 of the present invention uses the statistical count kept with each entry to enable filtering out less frequently used entries. The transient buffer 685 is typically small, e.g., on the order of 8 entries. By virtue of its small size, the buffer 685 is usually full during a regular pipeline cycle. Accordingly, when a new entry comes in from L2 cache 608, some entry needs to be evicted or removed from buffer 685 to make room for the new incoming entry. As discussed, the entry to be evicted can be determined based on one of the cache replacement policies chosen for replacement logic circuitry 514.

After determining the entry, confidence logic circuitry 510 can use the count associated with the entry to determine if the entry should be installed into the L1-cache 610 or discarded. In other words, confidence logic block 510 uses the count to determine if the entry is frequently used. If it is frequently used, it is installed in the lower level cache. If not, it is discarded. If the count is more than or equal to some predetermined threshold, it indicates that the entry has been accessed enough and it is a more frequently used entry. This entry will then be installed into L1 cache 610 and removed from the buffer to make room for new incoming entries. On the other hand, if the count of the entry chose by replacement logic module 514 to be evicted from the buffer is not equal to the predefined threshold, it indicates that the entry was not accessed enough times and, subsequently, the entry can simply be discarded without installing it in the L1 cache 610.

The above procedure also makes sure that entries that fall on a mispredicted path of a program flow will not get installed in L1 cache 610 as the access count of such entries will never change and reach the threshold unless they are accessed again.

FIG. 6 illustrates a sequence of instructions 680 in sequential order of increasing addresses. Instruction Brn target 1 681 is a branch instruction that jumps to Target 1 683. If the front-end of the pipeline incorrectly predicted this branch to be not-taken, it would bring the instructions including Fetch 1 682 into the transient buffer. For example, Fetch 1 682 could be installed as entry 699 into buffer 685 and the count for entry Fetch 1 699 would be increased from 0 to 1. When a mispredict is subsequently raised as a result of the incorrect prediction, the machine is redirected to Fetch 2. Since instructions from Fetch 2 684 onwards are accessed again in the process, their temporal locality, and the counts associated with their respective entries, are increased relative to Fetch 1. For example, Fetch 2 is accessed at steps 684, 688 and 696, thus, Fetch 2 has a count of 3 at entry 690 within buffer 685. Similarly Fetch 3 is accessed at steps 686 and 689 and has an associated count of 2 at entry 691. Finally, Fetch 4 is accessed at steps 687 and 695 and has an associated count of 2 at entry 692.

When Fetch 5 697 needs to be brought in, the replacement logic module 514 and confidence logic module 510 determine Fetch 1 699 to be an entry to be evicted and discarded. If using a Least Recently Used ("LRU") policy, the replacement logic module 514, determines Fetch 1 699 to be the least recently used entry because entries 690, 691 and 692 followed entry 699. Assuming a predetermined threshold level of 3, subsequently, confidence logic circuitry 510 determines Fetch 1 entry 699 to be below the threshold level and discards the entry. If, however, Fetch 1 entry 699 had a threshold level of 3 or more, it would have been installed in L1 cache 610 instead of being discarded. After Fetch 1 entry 699 is discarded, Fetch 5 693 is installed into buffer 685. As Fetch 1 was discarded instead of being installed in L1 based on threshold, it saved a critical entry from being evicted from L1. Subsequently, if another fetch led to the eviction of Fetch 2 690, it would get installed into L1 cache 610 because the count for entry 690 is above the threshold level.

In one embodiment, the predefined initial value can be a value greater than zero and the count for an entry is decreased each time it is accessed. Further, when the count of an entry gets decremented to zero, it is determined to be frequently accessed and is installed into the lower level structure, e.g., L1 cache 610. The advantage of decrementing the counter with each access is that the computational cost is much lower for comparing the count of an entry to zero, which would be the counter value for a frequently accessed entry under this scheme.

Figure 7:
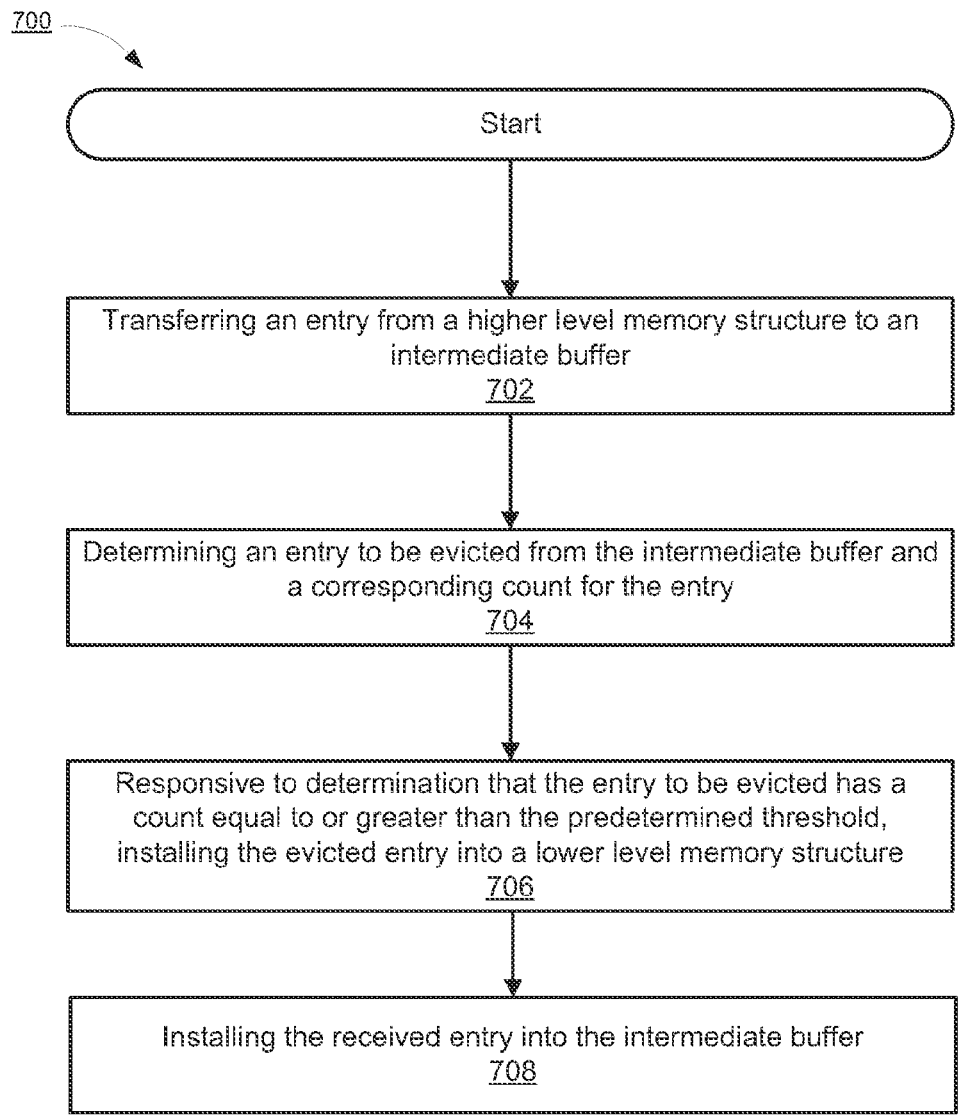
FIG. 7 depicts a flowchart for an exemplary computer controlled process for preventing non-temporal entries from polluting small critical structures in accordance with embodiments of the present invention.

FIG. 7 depicts a flowchart for an exemplary computer controlled process for preventing non-temporal entries from polluting small critical structures in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 6 should not be construed as limiting the scope of the invention. Rather, it will be apparent to persons skilled in the relevant art(s) from the teachings provided herein that other functional flows are within the scope and spirit of the present invention. Flowchart 600 may be described with continued reference to exemplary embodiments described above, though the method is not limited to those embodiments.

At step 702, one or more entries are transferred from a higher level structure, e.g., a L2 cache to an intermediate buffer such as the transient buffer 685 of the present invention.

At step 704, the replacement logic circuitry 514 determines the entry to be evicted from the transient buffer 685. As discussed above, some examples of replacement policies are an access counter based replacement policy, a least-recently used replacement policy or a random replacement policy. Further, a corresponding count for the entry to be evicted is also determined.

At step 706, responsive to a determination that the count for the evicted entry is equal to or greater than a predetermined threshold value, the transient buffer installs the evicted entry into a lower level memory structure, e.g., a L1 cache. If the count is less than the threshold value, however, the entry is discarded.

Finally at step 706, the entry received from the higher level structure is installed into the slot left open by the evicted entry in the transient buffer.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for preventing non-temporal entries from entering small critical structures, said method comprising:
   transferring a first entry from a higher level memory structure to an intermediate buffer;
   determining a second entry to be evicted from said intermediate buffer and a corresponding value associated with said second entry, wherein the intermediate buffer is a temporary buffer in between the higher level memory structure and a lower level memory structure and operable to temporarily store entries from the higher level memory structure;
   responsive to a determination that said second entry is frequently accessed, installing said second entry from said intermediate buffer into the lower level memory structure, wherein the intermediate buffer lies in an intermediate position between the higher level memory structure and the lower level memory structure, and wherein said lower level structure is a conversion lookaside buffer, and wherein each entry in said conversion lookaside buffer is a mapping between a guest address and a corresponding native address; and
   installing said first entry into a slot previously occupied by said second entry in said intermediate buffer.

2. The method of claim 1, wherein said higher level memory structure comprises a Level 2 cache memory.

3. The method of claim 1, wherein said lower level memory structure is chosen from a group consisting of: a L1 data cache memory, a L1 instruction cache memory and a conversion lookaside buffer.

4. The method of claim 1, further comprising:
   responsive to a determination that said second entry is not frequently accessed, discarding said second entry.

5. The method of claim 1, wherein said determining is based on a replacement policy, wherein said replacement policy is selected from a group consisting of: an access counter based replacement policy, a least-recently used replacement policy and a random replacement policy.

6. The method of claim 1, wherein said determination that said second entry is frequently accessed comprises computing that said count for said second entry is equal to or greater than a predetermined threshold value, and wherein said value associated with said second entry is a counter value.

7. A processor unit configured to perform a method for preventing non-temporal entries from entering small critical structures, said method comprising:
   transferring a first entry from a higher level memory structure to an intermediate buffer;

determining a second entry to be evicted from said intermediate buffer and a corresponding value associated with said second entry, wherein the intermediate buffer is a temporary buffer in between the higher level memory structure and a lower level memory structure and operable to temporarily store entries from the higher level memory structure;

responsive to a determination that said second entry is frequently accessed, installing said second entry from said intermediate buffer into the lower level memory structure, wherein the intermediate buffer lies in an intermediate position between the higher level memory structure and the lower level memory structure, and wherein said lower level structure is a conversion lookaside buffer, and wherein each entry in said conversion lookaside buffer is a mapping between a guest address and a corresponding native address; and installing said first entry into a slot previously occupied by said second entry in said intermediate buffer.

8. The method of claim 7, wherein said higher level memory structure comprises a Level 2 cache memory.

9. The method of claim 7, wherein said lower level memory structure is chosen from a group consisting of: a L1 data cache memory, a L1 instruction cache memory and a conversion lookaside buffer.

10. The method of claim 7, further comprising:
responsive to a determination that said second entry is not frequently accessed, discarding said second entry.

11. The method of claim 7, wherein said determining is based on a replacement policy, wherein said replacement policy is selected from a group consisting of: an access counter based replacement policy, a least-recently used replacement policy and a random replacement policy.

12. The method of claim 7, wherein said determination that said second entry is frequently accessed comprises computing that said count for said second entry is equal to or greater than a predetermined threshold value, and wherein said value associated with said second entry is a counter value.

13. An apparatus for preventing non-temporal entries from entering small critical structures, said apparatus comprising:

a memory;
a processor communicatively coupled to said memory, wherein said processor is configured to:
transfer a first entry from a higher level memory structure to an intermediate buffer, wherein the intermediate buffer is a temporary buffer in between the higher level memory structure and a lower level memory structure and operable to temporarily store entries from the higher level memory structure;
determine a second entry to be evicted from said intermediate buffer and a corresponding value associated with said second entry;
responsive to a determination that said second entry is frequently accessed, install said second entry from said intermediate buffer into the lower level memory structure, wherein the intermediate buffer lies in an intermediate position between the higher level memory structure and the lower level memory structure, and wherein said lower level structure is a conversion lookaside buffer, and wherein each entry in said conversion lookaside buffer is a mapping between a guest address and a corresponding native address; and
install said first entry into a slot previously occupied by said second entry in said intermediate buffer.

14. The apparatus of claim 13, wherein said higher level memory structure comprises a Level 2 cache memory.

15. The apparatus of claim 13, wherein said lower level memory structure is chosen from a group consisting of: a L1 data cache memory, a L1 instruction cache memory and a conversion lookaside buffer.

16. The apparatus of claim 13, wherein said processor is further configured to discard said second entry responsive to a determination that said second entry is not frequently accessed.

17. The apparatus of claim 13, wherein said processor is configured to determine said second entry to be evicted based on a replacement policy, wherein said replacement policy is selected from a group consisting of: an access counter based replacement policy, a least-recently used replacement policy and a random replacement policy.

* * * * *